(12) United States Patent
Okumura

(10) Patent No.: US 9,946,065 B2
(45) Date of Patent: Apr. 17, 2018

(54) ZOOM LENS AND IMAGE PICKUP APPARATUS INCLUDING THE SAME

(71) Applicant: CANON KABUSHIKI KAISHA, Tokyo (JP)

(72) Inventor: Tetsuichiro Okumura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/232,109

(22) Filed: Aug. 9, 2016

(65) Prior Publication Data
US 2017/0052352 A1  Feb. 23, 2017

(30) Foreign Application Priority Data

Aug. 21, 2015  (JP) .................................. 2015-163563

(51) Int. Cl.
| | | |
|---|---|---|
| G02B 9/14 | (2006.01) | |
| G02B 27/00 | (2006.01) | |
| G02B 13/02 | (2006.01) | |
| G02B 13/16 | (2006.01) | |

(52) U.S. Cl.
CPC ......... *G02B 27/0062* (2013.01); *G02B 13/02* (2013.01); *G02B 13/16* (2013.01)

(58) Field of Classification Search
CPC ......... G02B 13/0035; G02B 9/12; G02B 9/14
USPC .................................. 359/716, 753, 784–786
See application file for complete search history.

(56) References Cited

U.S. PATENT DOCUMENTS

| | | | |
|---|---|---|---|
| 7,948,691 B2 | 5/2011 | Okumura | |
| 2016/0274336 A1* | 9/2016 | Kawamura | .............. G02B 9/64 |

FOREIGN PATENT DOCUMENTS

| | | |
|---|---|---|
| JP | H11119092 A | 4/1999 |
| JP | 2011081064 A | 4/2011 |
| JP | 2012193065 A | 10/2012 |

\* cited by examiner

*Primary Examiner* — William Choi
(74) *Attorney, Agent, or Firm* — Rossi, Kimms & McDowell LLP

(57) ABSTRACT

Provided is an optical system, including, in order from an object side to an image side, a first lens unit having a positive refractive power, a second lens unit having a negative refractive power, which is configured to move during focusing, and a third lens unit having a positive or negative refractive power, the first lens unit consisting of, in order from the object side to the image side, a positive lens (Gp1), a positive lens (Gp2), and a subunit including a plurality of lenses, the subunit including at least one negative lens, in which an Abbe number vdGp1 of a material of the positive lens (Gp1), an Abbe number vdGn1 of a material of a negative lens (Gn1) closest to the object side among the negative lenses of the subunit, and a partial dispersion ratio θgFGn1 of the material of the negative lens (Gn1) are each appropriately set.

14 Claims, 4 Drawing Sheets

ZOOM LENS AND IMAGE PICKUP APPARATUS INCLUDING THE SAME

BACKGROUND OF THE INVENTION

Field of the Invention

The present invention relates to an optical system and an image pickup apparatus including the same, which are suitable for, for example, an image pickup optical system to be used for an image pickup apparatus, e.g., a digital still camera, a digital video camera, a television (TV) camera, or a monitoring camera.

Description of the Related Art

Optical systems to be used for image pickup apparatus are demanded to have a small total length of a zoom lens and small weight as a whole. Here, the "total length of a zoom lens" refers to a length obtained by adding a value of air-equivalent back focus to a distance from a first lens surface to a final lens surface of the zoom lens. In general, telephoto lenses (telephoto optical systems) with a large aperture ratio tend to have a large total length of the zoom lens and a large total weight of the zoom lens.

In general, in optical systems that are small in size and weight, chromatic aberrations such as an axial chromatic aberration and a lateral chromatic aberration tend to be generated by a large amount, leading to deterioration in optical characteristics. In Japanese Patent Application Laid-Open No. H11-119092, there is described an optical system that employs a lens made of a material having an extraordinary partial dispersion characteristic in order to reduce chromatic aberrations.

Specifically, in Japanese Patent Application Laid-Open No. H11-119092, there is described a telephoto optical system that employs, in order to reduce chromatic aberrations, a positive lens made of a low dispersion optical material having an extraordinary partial dispersion characteristic, e.g., fluorite, and a negative lens made of a high dispersion optical material. In telephoto lenses, chromatic aberrations are generally corrected with lenses on an object side that axial paraxial rays and pupil paraxial rays enter at relatively high incident heights. Here, the "axial paraxial ray" is a paraxial ray that is light entering an optical system in parallel with the optical axis of the optical system at a height 1 from the optical axis, with a focal length of the entire optical system being normalized to be 1. Further, the "pupil paraxial ray" is a paraxial ray that is one of light rays entering the optical system at an angle of 45° to the optical axis, and passes through an intersection between an entrance pupil of the optical system and the optical axis, with the focal length of the entire optical system being normalized to be 1.

In Japanese Patent Application Laid-Open No. 2011-81064, there is described an optical system that employs, in addition to a lens made of a low dispersion optical material having an extraordinary partial dispersion characteristic, a lens made of a high dispersion optical material having an extraordinary partial dispersion characteristic in order to correct chromatic aberrations, and reduce the entire optical system in weight.

Further, in Japanese Patent Application Laid-Open No. 2012-193065, there is disclosed a high dispersion optical material having a high refractive index and a low extraordinary partial dispersion characteristic. Hitherto, high dispersion materials having a high refractive index tend to have a strong extraordinary partial dispersion characteristic. Using a high dispersion material having a high refractive index as a material of a negative lens arranged on a relatively object side in a telephoto lens is effective for primary achromatization, but has a difficulty in reducing a secondary spectrum effectively. Meanwhile, the material disclosed in Japanese Patent Application Laid-Open No. 2012-193065 has a weak extraordinary partial dispersion characteristic although the material is a high dispersion material having a high refractive index. Thus, chromatic aberrations can be satisfactorily corrected with the use of lenses made of such a material.

In telephoto optical systems, as a focal length of the telephoto optical system is increased, lenses arranged on an object side in the optical system are increased in size and weight, leading to an increase in generation amount of chromatic aberrations. In order to obtain a telephoto optical system with high optical characteristics, which is small in size and weight as a whole and is configured to satisfactorily correct chromatic aberrations, it is important to appropriately set the structure of the lenses arranged on the object side in the optical system.

SUMMARY OF THE INVENTION

According to one embodiment of the present invention, there is provided an optical system, including, in order from an object side to an image side, a first lens unit having a positive refractive power, a second lens unit having a negative refractive power, which is configured to move during focusing, and a third lens unit having one of a positive refractive power and a negative refractive power, the first lens unit consisting of, in order from the object side to the image side, a positive lens Gp1, a positive lens Gp2, and a subunit including a plurality of lenses, the subunit including at least one negative lens, in which the following conditional expressions are satisfied:

$$18 \leq vdGp1 \leq 50.0;$$

$$18 \leq vdGn1 \leq 40.0; \text{ and}$$

$$-0.004 < \theta gFGn1 - 0.6438 + 0.001682 \times vdGn1 < 0.012,$$

where vdGp1 represents an Abbe number of a material of the positive lens Gp1, vdGn1 represents an Abbe number of a material of a negative lens Gn1 closest to the object side among the at least one negative lens of the subunit, and θgFGn1 represents a partial dispersion ratio of the material of the negative lens Gn1.

Further features of the present invention will become apparent from the following description of exemplary embodiments with reference to the attached drawings.

DESCRIPTION OF THE EMBODIMENTS

In the following, exemplary embodiments of the present invention are described with reference to the attached drawings. An optical system of the present invention includes, in order from an object side to an image side, a first lens unit having a positive refractive power, a second lens unit having a negative refractive power, which is configured to move on an optical axis during focusing, and a third lens unit having a positive or negative refractive power.

Figure 1:
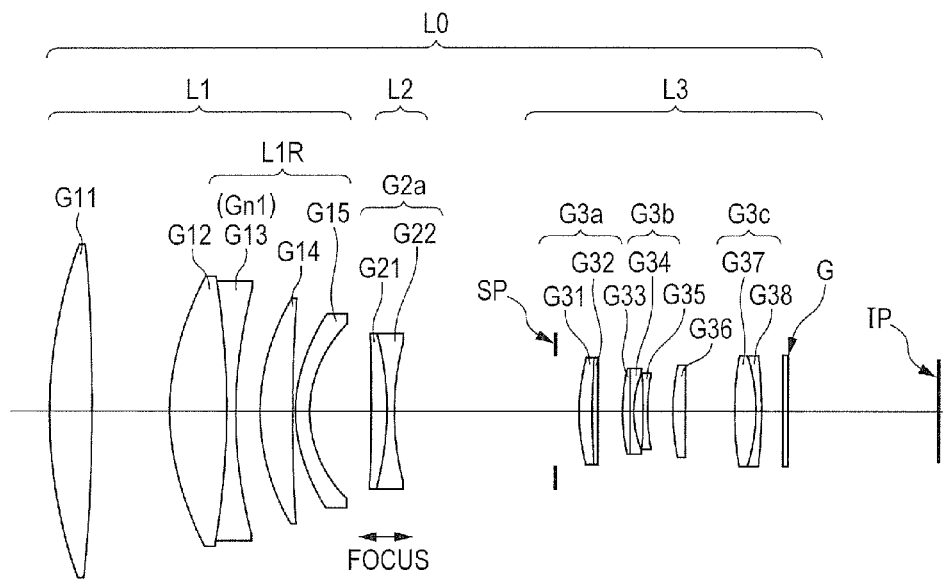
FIG. 1 is a lens cross-sectional view of an optical system according to Example 1 of the present invention when an object distance is infinity.
Figure 2:
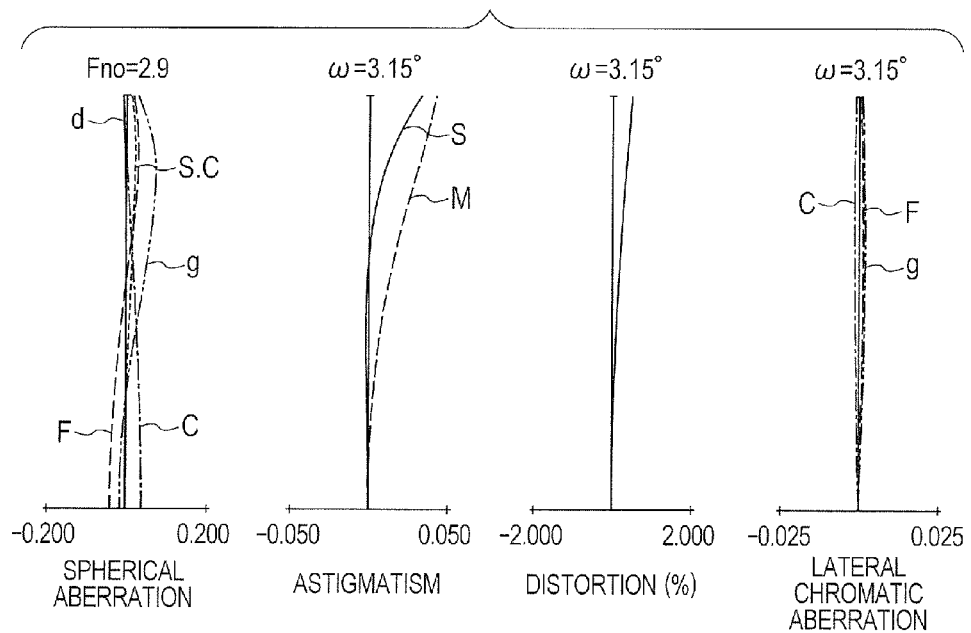
FIG. 2 is aberration diagrams of the optical system according to Example 1 of the present invention when the object distance is infinity.
Figure 3:
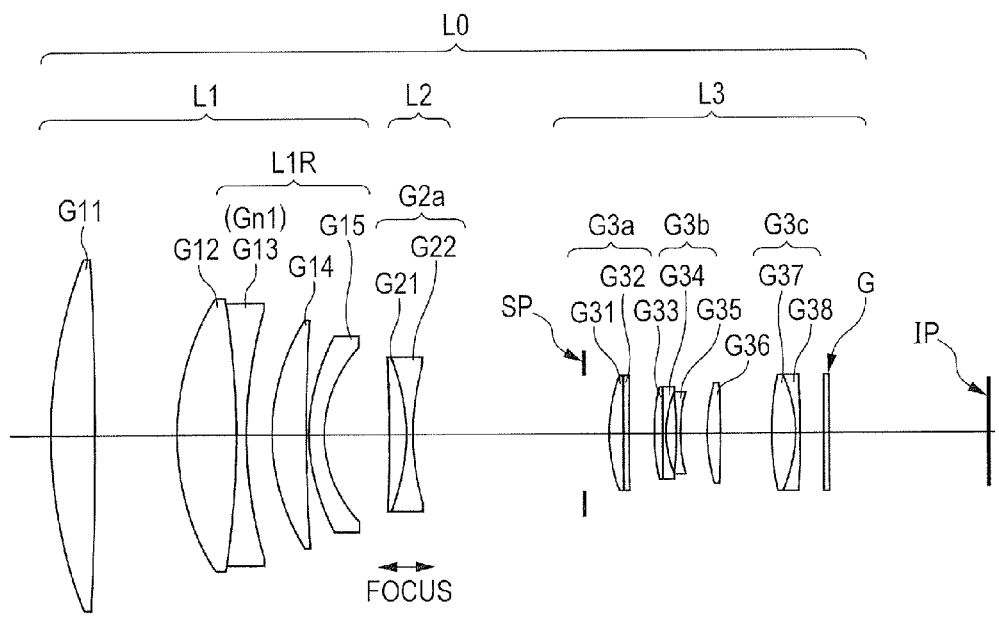
FIG. 3 is a lens cross-sectional view of an optical system according to Example 2 of the present invention when an object distance is infinity.
Figure 4:
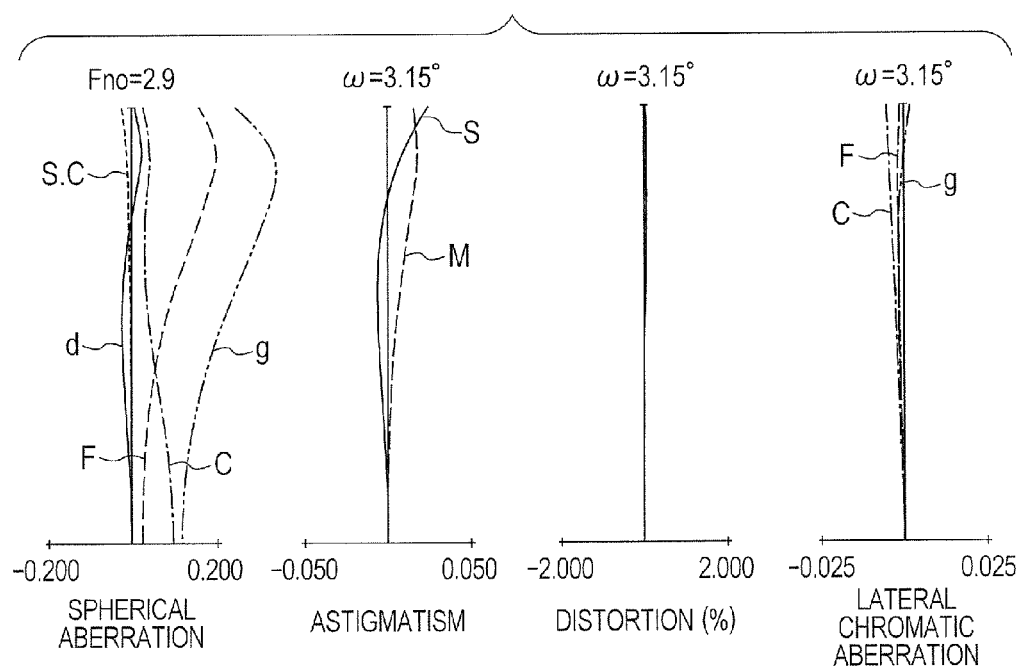
FIG. 4 is aberration diagrams of the optical system according to Example 2 of the present invention when the object distance is infinity.
Figure 5:
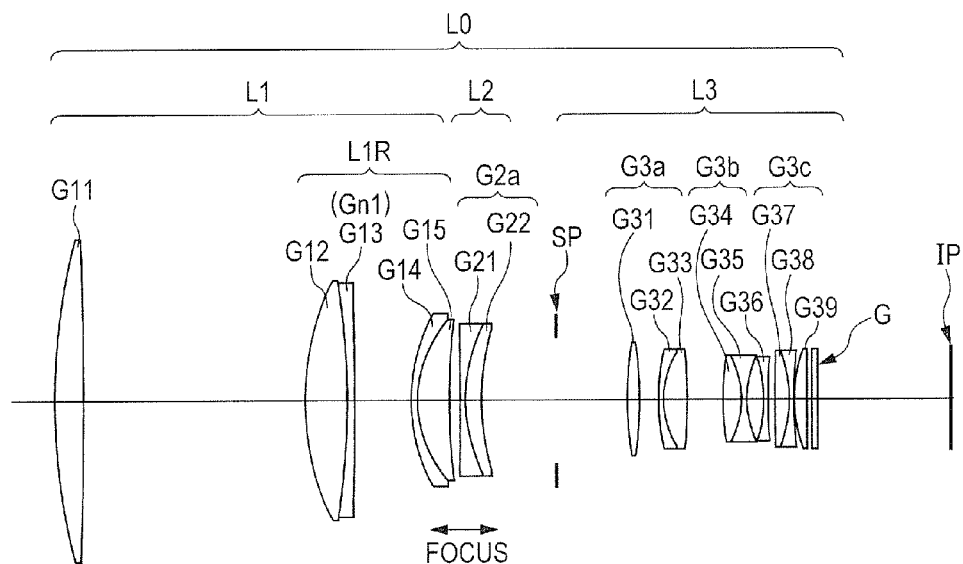
FIG. 5 is a lens cross-sectional view of an optical system according to Example 3 of the present invention when an object distance is infinity.
Figure 6:
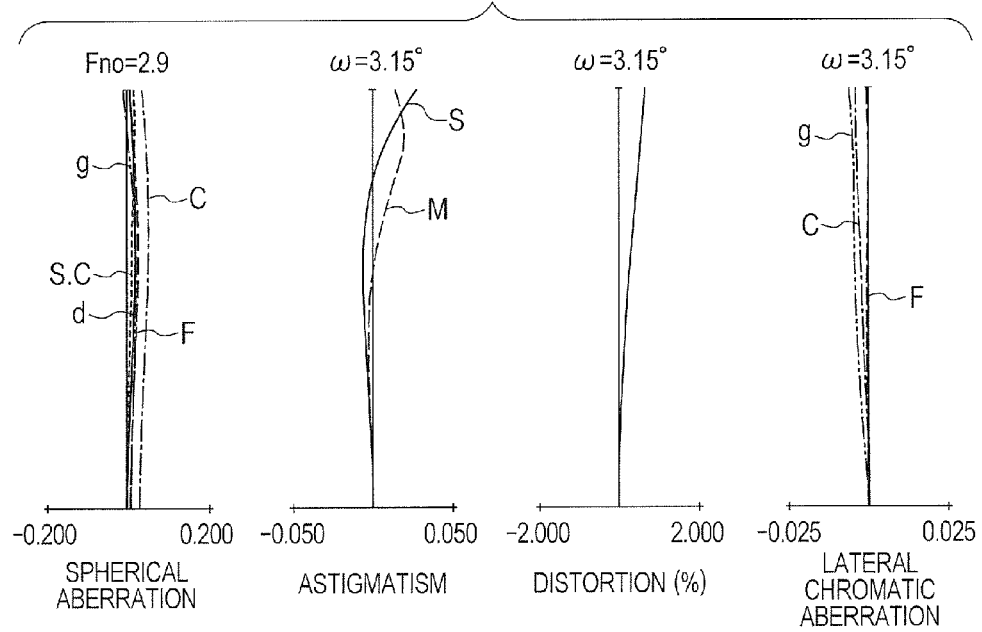
FIG. 6 is aberration diagrams of the optical system according to Example 3 of the present invention when the object distance is infinity.

FIG. 1 is a lens cross-sectional view of an optical system according to Example 1 of the present invention. FIG. 2 is aberration diagrams of the optical system according to Example 1 of the present invention. The optical system of Example 1 is a telephoto optical system having an F-number of 2.90 and an image pickup angle of view of 6.3°. FIG. 3 is a lens cross-sectional view of an optical system according to Example 2 of the present invention. FIG. 4 is aberration diagrams of the optical system according to Example 2 of the present invention. The optical system of Example 2 is a telephoto optical system having an F-number of 2.90 and an image pickup angle of view of 6.3°. FIG. 5 is a lens cross-sectional view of an optical system according to Example 3 of the present invention. FIG. 6 is aberration diagrams of the optical system according to Example 3 of the present invention. The optical system of Example 3 is a telephoto optical system having an F-number of 2.90 and an image pickup angle of view of 6.3°.

Figure 7:
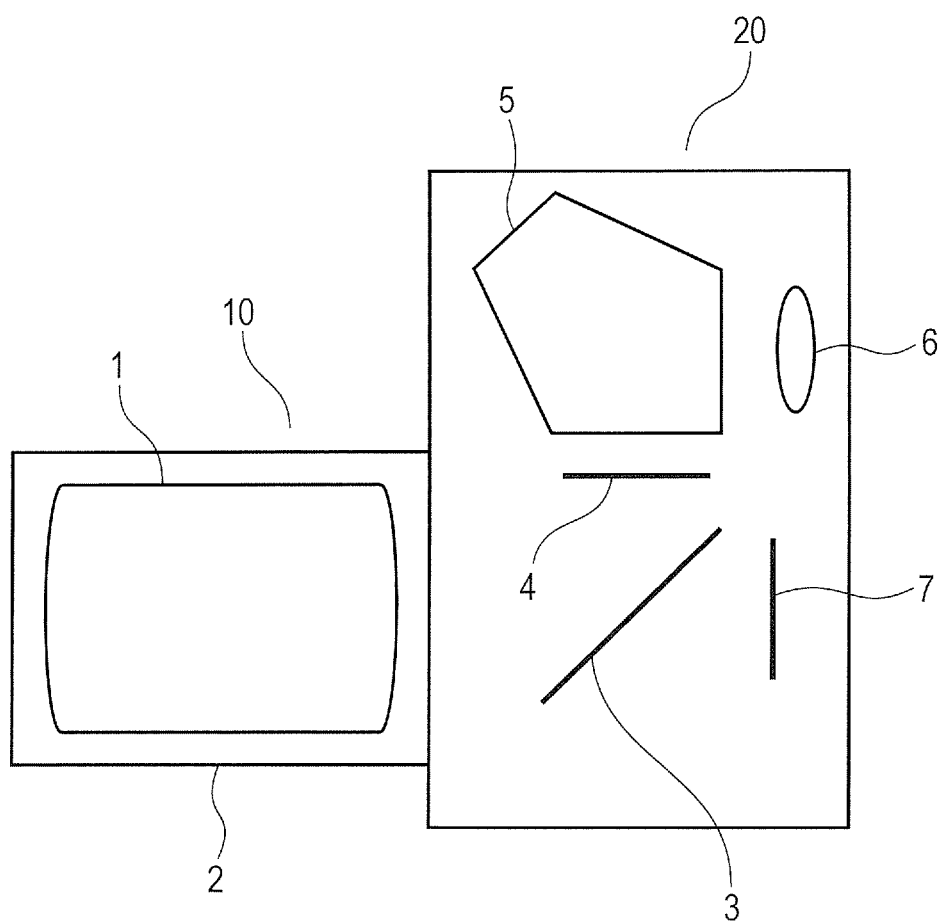
FIG. 7 is an explanatory diagram of an image pickup apparatus on which the optical system of the present invention is mounted.

FIG. 7 is a schematic diagram of a main part of a single-lens reflex camera system (image pickup apparatus) having the optical system of the present invention mounted on a body of the camera. In each lens cross-sectional view, there are illustrated an optical system L0 and an aperture stop SP configured to determine the maximum diameter of axial light fluxes. The optical system L0 includes, in order from an object side to an image side, a first lens unit L1 having a positive refractive power, a second lens unit L2 having a negative refractive power, which is configured to move during focusing, and a third lens unit L3 having a positive or negative refractive power.

An optical block G corresponds to an optical filter, a face plate, a quartz low-pass filter, an infrared cut filter, or the like. An image plane IP corresponds to an image pickup surface of an image pickup element (photo-electric conversion element) such as a CCD sensor or a CMOS sensor configured to receive light of images when the optical system is used as a photographing optical system for use in a video camera or a digital camera, and corresponds to a film surface when the optical system is used as an image pickup optical system of a silver halide film camera.

In each spherical aberration diagram and each lateral chromatic aberration diagram of the aberration diagrams, d represents d-line (wavelength of 587.6 nm), g represents g-line (wavelength of 435.8 nm), C represents C-line (wavelength of 656.3 nm), F represents F-line (wavelength of 486.1 nm), and S.C represents a sine condition. In each astigmatism diagram, a dotted line M represents a meridional image plane of the d-line, and a solid line S represents a sagittal image plane of the d-line.

Fno represents an F-number and ω represents a half angle of view. When each Numerical Example, which is described later, is expressed in units of mm, the spherical aberration, the astigmatism, the distortion, and the lateral chromatic aberration are respectively drawn on scales of 0.2 mm, 0.05 mm, 2%, and 0.025 mm throughout all the aberration diagrams. The optical system L0 of each Example is a telephoto optical system and has the following structural features.

The first lens unit includes, in order from the object side to the image side, a positive lens Gp1, a positive lens Gp2, and a subunit including a plurality of lenses. The subunit includes at least one negative lens. When an Abbe number of a material of the positive lens Gp1 is represented by vdGp1, an Abbe number of a material of a negative lens Gn1, which is closest to the object side among the negative lenses of the subunit, is represented by vdGn1, and a partial dispersion ratio of the material of the negative lens Gn1 is represented by θgFGn1, the optical system of each Example satisfies the following conditional expressions.

$$18 \leq vdGp1 \leq 50.0 \quad (1)$$

$$18 \leq vdGn1 \leq 40.0 \quad (2)$$

$$-0.004 < \theta gFGn1 - 0.6438 + 0.001682 \times vdGn1 < 0.012 \quad (3)$$

In general, in telephoto optical systems (image pickup optical systems), e.g., telephoto lenses, among various aberrations, chromatic aberrations are corrected mainly with a first lens unit through which axial paraxial rays and pupil paraxial rays pass at relatively high positions from an optical axis. Specifically, a low dispersion material having an extraordinary partial dispersion characteristic, e.g., fluorite, is used for a positive lens of the first lens unit, whereas a high dispersion material having a weak extraordinary dispersion characteristic is used for a negative lens of the first lens unit, to thereby correct chromatic aberrations.

In this case, the Abbe number vd and the partial dispersion ratio θgF of the material are represented by the following expressions, respectively, when a refractive index to the g-line is represented by Ng, a refractive index to the F-line is represented by NF, a refractive index to the d-line is represented by Nd, and a refractive index to the C-line is represented by NC.

$$vd = Nd - 1/NF - NC$$

$$\theta gF = Ng - NF/NF - NC$$

In general, higher dispersion materials tend to have a stronger extraordinary dispersion characteristic in many cases. Consequently, using such high dispersion materials leads to a difficulty in correcting chromatic aberrations. The material (glass material) disclosed in Japanese Patent Application Laid-Open No. 2012-193065 has a relatively weak extraordinary partial dispersion characteristic although the material is a high dispersion material having a high refractive index. Thus, the material is suitable for correcting chromatic aberrations in telephoto optical systems.

In the optical system of the present invention, the material disclosed in Japanese Patent Application Laid-Open No. 2012-193065 is used as the material of the negative lens closest to the object side among the negative lenses of the first lens unit L1. Further, a high dispersion material containing a large amount of Ti is used as the material of the positive lens Gp1 closest to the object side in order to perform primary achromatization. High dispersion materials having a large amount of Ti have a refractive index higher than that of ordinary low dispersion materials having a low refractive index, an extraordinary dispersion characteristic required for secondary achromatization, and a low specific gravity. Thus, such high dispersion materials are suitable for use as front lenses of telephoto optical systems.

In the present invention, a high refractive index material can be used as the material of the positive lens Gp1 closest to the object side in the first lens unit L1, and hence a predetermined refractive power is easily obtained and the effective diameters of lenses arranged on the image plane side of the positive lens Gp1 are set to be small. Further, the material disclosed in Japanese Patent Application Laid-Open No. 2012-193065 is used as the material of the negative lens Gn1, and hence power for correcting chromatic aberrations, which is shared between lenses arranged on the image side of the negative lens Gn1, is greatly reduced. As a result, the effective diameters of the lenses arranged on the image side of the negative lens Gn1 can be small.

As described above, the materials of the positive lens Gp1 and the negative lens Gn1, which is a negative lens closest to the object side among the negative lenses of the first lens unit, are appropriately selected so that the light-weight and compact first lens unit L1 can be achieved. Conditional Expression (1) defines that a high dispersion material having a small Abbe number is used as the material of the positive lens Gp1. The first lens unit L1 has a positive refractive power, and hence a low dispersion material is preferably used as the material of the positive lens in consideration of conditions for achromatization in the first lens unit L1.

Conditional Expression (1) is intended to perform primary achromatization with the negative lens Gn1 in a balanced manner. When the value exceeds the upper limit of Conditional Expression (1) or falls below the lower limit of Conditional Expression (1), it is difficult to perform the achromatization in the first lens unit L1, with the result that chromatic aberrations vary greatly during focusing.

It is more preferred to set the numerical range of Conditional Expression (1) as follows.

$$25.0 \leq vdGp1 \leq 45.0 \tag{1a}$$

Conditional Expression (2) defines that a high dispersion material having a small Abbe number is used as the material of the negative lens Gn1. The first lens unit L1 has a positive refractive power, and hence a high dispersion material is preferably used as the material of the negative lens in consideration of the conditions for the achromatization in the first lens unit L1.

Conditional Expression (2) is intended to satisfactorily perform primary achromatization with the positive lens Gp1. When the value exceeds the upper limit of Conditional Expression (2) or falls below the lower limit of Conditional Expression (2), it is difficult to perform the achromatization in the first lens unit L1, with the result that chromatic aberrations vary greatly during focusing. It is more preferred to set the numerical range of Conditional Expression (2) as follows.

$$20.0 \leq vdGn1 \leq 35.0 \tag{2a}$$

Conditional Expression (3) defines that a glass material having a weak extraordinary dispersion characteristic is used as the material of the negative lens Gn1. In the telephoto optical system, an axial chromatic aberration and a lateral chromatic aberration are easily corrected by using, on the object side of the aperture stop SP, a material having a high extraordinary dispersion characteristic in a positive direction as the material of the positive lenses, and a material having a low extraordinary dispersion characteristic in the positive direction as the material of the negative lenses. Further, the negative lens Gn1 is arranged at the position where incident heights of axial paraxial rays are high so that power required for correcting chromatic aberrations, which is shared between the lenses, can be reduced. In this way, a compact optical system, which is small in size and weight as a whole, is achieved.

When the value exceeds the upper limit of Conditional Expression (3), chromatic aberrations are not sufficiently corrected. Further, when the value falls below the lower limit of Conditional Expression (3), chromatic aberrations are excessively corrected. It is more preferred to set the numerical range of Conditional Expression (3) as follows.

$$0.002 < \theta gFGn1 - 0.6438 + 0.001682 \times vdGn1 < 0.012 \tag{3a}$$

As described above, according to the present invention, an optical system with high optical characteristics can be obtained, which is small in size and weight as a whole and is configured to satisfactorily correct various aberrations typified by chromatic aberrations.

In the present invention, it is more preferred to satisfy at least one of the following conditional expressions. Here, a partial dispersion ratio of the material of the positive lens Gp1 is represented by $\theta gFGp1$. A refractive index and a specific gravity of the material of the positive lens Gp1 are represented by $ndGp1$ and $dGp1$, respectively. In this case, the specific gravity $dGp1$ of the material refers to the ratio of the mass of the material at 20° C., which is used for the positive lens Gp1, to the mass of pure water with the same volume as the material, under a pressure of 101.325 kPa (normal atmospheric pressure) at 4° C.

A focal length of the positive lens Gp1 is represented by fGp1, and an interval on the optical axis between the positive lens Gp1 and the positive lens Gp2 is represented by L12.

$$0.000 < \theta FGp1 - 0.6438 + 0.001682 \times vdGp1 < 0.020 \tag{4}$$

$$2.00 \leq dGp1 \leq 3.006933 \times ndGp1 - 2.01278 \tag{5}$$

$$1.50 \leq ndGp1 \leq 1.71 \tag{6}$$

$$0.08 < L12/fGp1 < 0.25 \tag{7}$$

Next, the technical meanings of the respective conditional expressions described above are described. Conditional Expression (4) defines that a glass material having a high extraordinary dispersion characteristic in the positive direction is used as the material of the positive lens Gp1. In the telephoto optical system, an axial chromatic aberration and a lateral chromatic aberration are easily corrected by using, on the object side of the aperture stop SP, a material having a high extraordinary dispersion characteristic in the positive direction as the material of the positive lenses, and a material having a low extraordinary dispersion characteristic in the positive direction as the material of the negative lenses. Further, the positive lens Gp1 is arranged at the position where incident heights of axial paraxial rays are the highest so that power required for correcting chromatic aberrations, which is shared between the positive lens Gp2 and the subsequent lenses, can be reduced. In this way, the first lens unit L1, which is small in size and weight, and an optical system, which is compact as a whole, are achieved.

When the value exceeds the upper limit of Conditional Expression (4), chromatic aberrations are excessively corrected. Further, when the value falls below the lower limit of Conditional Expression (4), chromatic aberrations are not sufficiently corrected. It is more preferred to set the numerical range of Conditional Expression (4) as follows.

$$0.004 < \theta gFGp1 - 0.6438 + 0.001682 \times vdGp1 < 0.015 \tag{4a}$$

Conditional Expression (5) relates to the specific gravity of the material of the positive lens Gp1 in the first lens unit L1. As the focal length is increased, the ratio of the weight of the positive lens Gp1 closest to the object side in the first lens unit L1 to the weight of the optical system tends to be increased. When the value exceeds the upper limit of Conditional Expression (5), the specific gravity is heavy, and hence it is difficult to reduce the entire system in weight.

It is more preferred to set the numerical range of Conditional Expression (5) as follows.

$$2.00 \leq dGp1 \leq 2.4094 \times ndGp1 - 1.1334 \quad (5a)$$

In this case, the specific gravity refers to the ratio of the mass of the material at 20° C., which is used for the positive lens Gp1, to the mass of pure water with the same volume as the material, under a pressure of 101.325 kPa (normal atmospheric pressure) at 4° C.

Conditional Expression (6) relates to the refractive index of the material of the positive lens Gp1 in the first lens unit L1. In obtaining the same refractive power of a lens, as a refractive index of a material of the lens is increased, the volume of the lens can be reduced. However, as the refractive index of a material available today is increased, the specific gravity thereof is accordingly increased. Thus, when the value exceeds the upper limit of Conditional Expression (6), the specific gravity is heavy, and hence it is difficult to reduce the positive lens Gp1 in weight. Further, when the value falls below the lower limit of Conditional Expression (6), the volume of the lens is increased, and hence it is difficult to reduce the positive lens Gp1 in weight.

It is more preferred to set the numerical range of Conditional Expression (6) as follows.

$$1.55 \leq ndGp1 \leq 1.70 \quad (6a)$$

Conditional Expression (7) is a conditional expression relating to the ratio of the interval L12 on the optical axis between the positive lens Gp1 and the positive lens Gp2 to the focal length fGp1 of the positive lens Gp1. Increasing the interval L12 while maintaining the refractive power of the positive lens Gp1 facilitates a reduction in effective diameters of the positive lens Gp2 and the subsequent lenses, and hence the first lens unit L1 is reduced in weight. When the value exceeds the upper limit of Conditional Expression (7), the power of the positive lens Gp2 for correcting various aberrations (especially an axial chromatic aberration and a spherical aberration) is weak, and hence it is difficult to obtain high optical characteristics. When the value falls below the lower limit of Conditional Expression (7), the effective diameter of the positive lens Gp2 is large, and hence it is difficult to reduce the first lens unit L1 in weight.

It is more preferred to set the numerical range of Conditional Expression (7) as follows.

$$0.09 \leq L12/fGp1 \leq 0.23 \quad (7a)$$

The optical system L0 of each of Examples 1, 2, and 3 includes, in order from the object side to the image side, the first lens unit L1 having a positive refractive power, the second lens unit L2 having a negative refractive power, the aperture stop SP, and the third lens unit L3 having a positive refractive power. In Examples 1 and 2, the first lens unit L1 includes, in order from the object side to the image side, the positive lens Gp1 (G11), the positive lens Gp2 (G12), and a subunit L1R including a plurality of lenses. The subunit L1R includes, in order from the object side to the image side, a negative lens G13 (corresponding to the negative lens Gn1), a positive lens G14, and a positive lens G15 having a convex surface on the object side.

The second lens unit L2 includes, in order from the object side to the image side, a cemented lens G2a obtained by cementing a positive lens G21 and a negative lens G22. The third lens unit L3 includes, in order from the object side to the image side, a cemented lens G3a obtained by cementing a positive lens G31 and a negative lens G32, and a cemented lens G3b obtained by cementing a positive lens G33 and a negative lens G34. The third lens unit L3 further includes a negative lens G35, a positive lens G36, and a cemented lens G3c obtained by cementing a positive lens G37 and a negative lens G38.

In Example 3, the lens structures of the first lens unit L1 and the second lens unit L2 are the same as those of Example 1. The third lens unit L3 includes, in order from the object side to the image side, the positive lens G31, the cemented lens G3a obtained by cementing the negative lens G32 and the positive lens G33, the cemented lens G3b obtained by cementing the positive lens G34 and the negative lens G35, the negative lens G36, the cemented lens G3c obtained by cementing the positive lens G37 and the negative lens G38, and a positive lens G39. Each lens surface is a spherical surface, and no aspherical surface is used in each Example.

In each Example, the second lens unit L2 is configured to move in an optical axis direction for performing focusing. Further, in correcting image blur, the subunit in the third lens unit L3 is moved in a direction having a direction component vertical to the optical axis such that an imaging position is moved in the direction vertical to the optical axis. In short, image stabilization is performed.

Next, Example in which the optical system according to the present invention is applied to an image pickup apparatus (camera system) is described referring to FIG. 7. FIG. 7 is a schematic diagram of a main part of a single-lens reflex camera. In FIG. 7, an image pickup lens 10 includes an optical system 1 of any one of Examples 1 to 3. The optical system 1 is held by a lens barrel 2 which is a holder member. A camera main body 20 includes a quick return mirror 3 configured to reflect a light flux from the image pickup lens 10 upward, a focusing screen 4 located at an image formation position on the image pickup lens 10, and a penta-dach prism 5 configured to convert an inverse image formed on the focusing screen 4 into an erected image. The camera main body 20 further includes an eyepiece lens 6 configured to observe the erected image and the like.

On a photosensitive surface 7, an image pickup element (photo-electric conversion element) such as a CCD sensor or a CMOS sensor and a silver halide film are provided. At the time of photographing, the quick return mirror 3 retracts from an optical path such that an image is formed by the image pickup lens 10 on the photosensitive surface 7. In this manner, by applying the optical system according to Examples 1 to 3 to an image pickup apparatus such as a photographing camera, a video camera, or a digital still camera, the image pickup apparatus that is small in weight and has excellent optical characteristics is realized. The optical system of the present invention can be similarly applied to an image pickup apparatus without a quick return mirror.

The exemplary embodiments of the present invention are described above, but the present invention is not limited to those embodiments and can be modified and changed variously within the scope of the gist thereof.

Now, Numerical Data 1 to 3 respectively corresponding to Examples 1 to 3 of the present invention are described. In each of Numerical Data, i indicates the order of a surface counted from the object side, ri is a curvature radius of the i-th surface counted from the object side, di is an interval between the i-th surface and an (i+1)th surface counted from the object side, ndi and vdi are a refractive index and an Abbe number of an optical member having the i-th surface, respectively. Values of the focal length, the F-number, the half angle of view are those obtained when focus is on an object at infinity. Moreover, back focus BF is an air-equivalent distance from a final lens surface to the image plane. The relationship between the conditional expressions described above and various numerical values in Numerical Examples is shown in Table 1.

<Numerical Data 1>

| Unit mm | | | | | |
|---|---|---|---|---|---|
| Surface data | | | | | |
| Surface Number | r | d | nd | vd | Effective diameter |
| 1 | 213.406 | 17.49 | 1.59270 | 35.3 | 135.39 |
| 2 | −744.182 | 32.02 | | | 134.55 |
| 3 | 115.001 | 23.00 | 1.43387 | 95.1 | 109.32 |
| 4 | −356.270 | 0.31 | | | 105.77 |
| 5 | −347.207 | 3.80 | 1.78760 | 23.4 | 105.48 |
| 6 | 211.329 | 10.00 | | | 99.18 |
| 7 | 91.746 | 13.57 | 1.43387 | 95.1 | 91.95 |
| 8 | 899.717 | 1.00 | | | 90.44 |
| 9 | 69.524 | 6.00 | 1.48749 | 70.2 | 79.22 |
| 10 | 50.681 | 25.39 | | | 70.73 |
| 11 | −617.793 | 6.74 | 1.92286 | 20.9 | 63.48 |
| 12 | −110.542 | 2.60 | 1.82170 | 35.9 | 62.57 |
| 13 | 111.977 | 67.17 | | | 58.67 |
| 14 (Stop) | ∞ | 10.00 | | | 45.89 |
| 15 | 85.641 | 5.67 | 1.74430 | 30.2 | 43.31 |
| 16 | 1,871.710 | 2.05 | 1.82693 | 28.7 | 42.30 |
| 17 | −2,324.897 | 10.16 | | | 41.70 |
| 18 | 87.907 | 2.92 | 1.90335 | 32.9 | 34.24 |
| 19 | 1,264.786 | 1.71 | 1.66155 | 56.7 | 33.54 |
| 20 | 44.216 | 3.73 | | | 30.94 |
| 21 | −195.875 | 1.63 | 1.90207 | 36.3 | 30.78 |
| 22 | 73.612 | 10.63 | | | 30.25 |
| 23 | 100.684 | 5.04 | 1.56472 | 44.2 | 36.46 |
| 24 | 11,254.788 | 19.98 | | | 37.19 |
| 25 | 114.866 | 9.34 | 1.73500 | 43.3 | 44.82 |
| 26 | −71.428 | 1.91 | 1.87317 | 21.8 | 44.90 |
| 27 | −251.303 | 8.98 | | | 45.22 |
| 28 | ∞ | 2.20 | 1.51633 | 64.1 | 44.96 |
| 29 | ∞ | 63.03 | | | 44.92 |
| Image surface | ∞ | | | | |

| Various data | |
|---|---|
| Focal length | 392.65 |
| F-number | 2.90 |
| Half angle of field (degree) | 3.15 |
| Image height | 21.64 |
| Total lens length | 367.31 |
| BF | 73.46 |
| Entrance pupil position | 712.58 |
| Exit pupil position | −131.31 |
| Front principal point position | 311.91 |
| Rear principal point position | −329.61 |

| Single lens unit data | | |
|---|---|---|
| Lens | First surface | Focal length |
| 1 | 1 | 281.73 |
| 2 | 3 | 203.38 |
| 3 | 5 | −166.30 |
| 4 | 7 | 234.28 |
| 5 | 9 | −428.29 |
| 6 | 11 | 144.96 |
| 7 | 12 | −67.34 |
| 8 | 15 | 120.42 |
| 9 | 16 | 1,254.21 |
| 10 | 18 | 104.46 |
| 11 | 19 | −69.30 |
| 12 | 21 | −59.14 |
| 13 | 23 | 179.87 |
| 14 | 25 | 61.22 |
| 15 | 26 | −114.85 |
| 16 | 28 | 0.00 |

<Numerical Data 2>

| Unit mm | | | | | |
|---|---|---|---|---|---|
| Surface data | | | | | |
| Surface Number | r | d | nd | vd | Effective diameter |
| 1 | 190.960 | 17.38 | 1.69895 | 30.1 | 135.37 |
| 2 | −1,492.233 | 31.98 | | | 134.30 |
| 3 | 105.767 | 23.00 | 1.43387 | 95.1 | 105.47 |
| 4 | −356.270 | 0.56 | | | 101.44 |
| 5 | −347.207 | 3.80 | 1.84663 | 20.6 | 100.68 |
| 6 | 171.051 | 10.00 | | | 93.76 |
| 7 | 84.012 | 13.51 | 1.43387 | 95.1 | 87.05 |
| 8 | 851.312 | 1.00 | | | 85.47 |
| 9 | 80.569 | 6.00 | 1.48749 | 70.2 | 76.56 |
| 10 | 50.449 | 25.36 | | | 67.50 |
| 11 | −665.467 | 6.73 | 1.92286 | 20.9 | 59.94 |
| 12 | −79.718 | 2.60 | 1.86162 | 29.5 | 59.48 |
| 13 | 111.114 | 67.19 | | | 55.72 |
| 14 (Stop) | ∞ | 9.99 | | | 46.52 |
| 15 | 62.348 | 5.70 | 1.74907 | 28.0 | 44.48 |
| 16 | −1,399.449 | 2.05 | 1.82713 | 43.6 | 43.90 |
| 17 | 622.463 | 10.18 | | | 42.91 |
| 18 | 89.922 | 2.95 | 1.89579 | 34.4 | 35.23 |
| 19 | −2,748.718 | 1.71 | 1.66950 | 57.5 | 34.61 |
| 20 | 44.216 | 3.84 | | | 31.70 |
| 21 | −195.875 | 1.63 | 1.90143 | 37.3 | 31.56 |
| 22 | 61.833 | 10.63 | | | 30.77 |
| 23 | 80.848 | 5.06 | 1.56201 | 44.4 | 37.71 |
| 24 | −383.086 | 20.00 | | | 38.21 |
| 25 | 109.336 | 9.34 | 1.74606 | 37.8 | 44.39 |
| 26 | −55.686 | 1.91 | 1.90273 | 21.2 | 44.33 |
| 27 | −368.285 | 8.97 | | | 44.61 |
| 28 | ∞ | 2.20 | 1.51633 | 64.1 | 44.44 |
| 29 | ∞ | 64.00 | | | 44.41 |
| Image surface | ∞ | | | | |

| Various data | |
|---|---|
| Focal length | 392.56 |
| F-number | 2.90 |
| Half angle of field (degree) | 3.15 |
| Image height | 21.64 |
| Total lens length | 368.52 |
| BF | 74.42 |
| Entrance pupil position | 754.66 |
| Exit pupil position | −121.03 |
| Front principal point position | 314.34 |
| Rear principal point position | −328.56 |

| Single lens unit data | | |
|---|---|---|
| Lens | First surface | Focal length |
| 1 | 1 | 243.25 |
| 2 | 3 | 190.85 |
| 3 | 5 | −134.90 |
| 4 | 7 | 213.70 |
| 5 | 9 | −296.16 |
| 6 | 11 | 97.60 |
| 7 | 12 | −53.53 |
| 8 | 15 | 79.82 |
| 9 | 16 | −520.63 |
| 10 | 18 | 97.25 |
| 11 | 19 | −64.98 |
| 12 | 21 | −51.98 |

-continued

Unit mm

| 13 | 23 | 119.25 |
| 14 | 25 | 50.68 |
| 15 | 26 | -72.89 |
| 16 | 28 | 0.00 |

<Numerical Data 3>

Unit mm

Surface data

| Surface Number | r | d | nd | vd | Effective diameter |
|---|---|---|---|---|---|
| 1 | 275.455 | 12.15 | 1.59270 | 35.3 | 135.37 |
| 2 | -2,990.760 | 94.23 | | | 134.82 |
| 3 | 118.629 | 18.03 | 1.43387 | 95.1 | 100.00 |
| 4 | -331.589 | 0.30 | | | 98.33 |
| 5 | -329.717 | 3.00 | 1.73800 | 32.3 | 98.05 |
| 6 | -2,359.332 | 24.17 | | | 95.88 |
| 7 | 81.386 | 2.50 | 1.67300 | 38.1 | 73.55 |
| 8 | 52.525 | 0.30 | | | 68.43 |
| 9 | 52.766 | 13.22 | 1.43387 | 95.1 | 68.37 |
| 10 | 244.780 | 5.00 | | | 66.42 |
| 11 | -1,220.778 | 2.00 | 1.95375 | 32.3 | 64.44 |
| 12 | 70.704 | 6.83 | 1.92286 | 20.9 | 60.88 |
| 13 | 106.492 | 32.06 | | | 59.32 |
| 14 (Stop) | ∞ | 30.00 | | | 54.04 |
| 15 | 149.955 | 5.50 | 1.43387 | 95.1 | 47.98 |
| 16 | -147.253 | 7.98 | | | 47.61 |
| 17 | 97.022 | 2.05 | 1.92286 | 20.9 | 41.64 |
| 18 | 40.200 | 9.95 | 1.51742 | 52.4 | 39.34 |
| 19 | -257.701 | 15.00 | | | 38.90 |
| 20 | 105.504 | 8.13 | 1.72047 | 34.7 | 36.29 |
| 21 | -39.675 | 2.00 | 1.67790 | 55.3 | 35.75 |
| 22 | 36.265 | 7.47 | | | 33.01 |
| 23 | -56.533 | 1.63 | 1.76385 | 48.5 | 33.25 |
| 24 | 180.389 | 3.20 | | | 35.26 |
| 25 | 257.484 | 6.09 | 1.85478 | 24.8 | 38.14 |
| 26 | -54.211 | 1.91 | 1.43875 | 94.9 | 38.85 |
| 27 | 175.219 | 0.15 | | | 40.80 |
| 28 | 58.785 | 5.74 | 1.60342 | 38.0 | 42.38 |
| 29 | -1,596.947 | 2.00 | | | 42.41 |
| 30 | ∞ | 2.20 | 1.51633 | 64.1 | 42.44 |
| 31 | ∞ | 57.20 | | | 42.46 |
| Image surface | ∞ | | | | |

Various data

| Focal length | 392.57 |
| F-number | 2.90 |
| Half angle of field (degree) | 3.15 |
| Image height | 21.64 |
| Total lens length | 382.00 |
| BF | 60.65 |
| Entrance pupil position | 491.47 |
| Exit pupil position | -101.19 |
| Front principal point position | -88.91 |
| Rear principal point position | -335.37 |

Single lens unit data

| Lens | First surface | Focal length |
|---|---|---|
| 1 | 1 | 426.14 |
| 2 | 3 | 203.85 |
| 3 | 5 | -519.68 |
| 4 | 7 | -228.03 |
| 5 | 9 | 151.87 |
| 6 | 11 | -70.02 |
| 7 | 12 | 208.84 |
| 8 | 15 | 172.20 |
| 9 | 17 | -75.69 |
| 10 | 18 | 67.98 |
| 11 | 20 | 40.98 |

-continued

Unit mm

| 12 | 21 | -27.65 |
| 13 | 23 | -56.18 |
| 14 | 25 | 52.87 |
| 15 | 26 | -94.12 |
| 16 | 28 | 94.08 |
| 17 | 30 | 0.00 |

TABLE 1

| | Example 1 | Example 2 | Example 3 |
|---|---|---|---|
| Conditional Expression (1) | 35.3 | 30.1 | 35.3 |
| Conditional Expression (2) | 23.4 | 20.6 | 32.3 |
| Conditional Expression (3) | 0.0056 | 0.0084 | 0.0004 |
| Conditional Expression (4) | 0.0089 | 0.0098 | 0.0089 |
| Conditional Expression (5) | 2.64 | 2.96 | 2.64 |
| Conditional Expression (6) | 1.5927 | 1.69895 | 1.5927 |
| Conditional Expression (7) | 0.114 | 0.131 | 0.221 |
| θgFGp1 | 0.5933 | 0.6030 | 0.5933 |
| θgFGn1 | 0.6100 | 0.6176 | 0.5899 |
| dGp1 | 2.64 | 2.96 | 2.64 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-163563, filed Aug. 21, 2015, which is hereby incorporated by reference herein in its entirety.

What is claimed is:

1. An optical system comprising, in order from an object side to an image side:
    a first lens unit having a positive refractive power;
    a second lens unit having a negative refractive power, which is configured to move during focusing; and
    a third lens unit having one of a positive refractive power or a negative refractive power,
    wherein the first lens unit consists of, in order from the object side to the image side:
        a positive lens Gp1;
        a positive lens Gp2; and
        a subunit comprising a plurality of lenses, including at least one negative lens,
    wherein the following conditional expressions are satisfied:

$$18 \leq vdGp1 \leq 45.0;$$

$$18 \leq vdGn1 \leq 40.0; \text{ and}$$

$$-0.004 < \theta gFGn1 - 0.6438 + 0.001682 \times vdGn1 < 0.012,$$

where:
    vdGp1 represents an Abbe number of a material of the positive lens Gp1,
    vdGn1 represents an Abbe number of a material of a negative lens Gn1 closest to the object side among the at least one negative lens of the subunit, and
    θgFGn1 represents a partial dispersion ratio of the material of the negative lens Gn1.

2. An optical system according to claim 1, wherein the following conditional expression is satisfied:

$$0.000 < \theta gFGp1 - 0.6438 + 0.001682 \times vdGp1 < 0.020,$$

where θgFGp1 represents a partial dispersion ratio of the material of the positive lens Gp1.

3. An optical system according to claim 1, wherein the following conditional expression is satisfied:

$$2.00 \leq dGp1 \leq 3.006933 \times ndGp1 - 2.01278,$$

where ndGp1 represents a refractive index of the material of the positive lens Gp1, and dGp1 represents a specific gravity of the material of the positive lens Gp1, the specific gravity dGp1 of the material being a ratio of a mass of the material at 20° C., which is used for the positive lens Gp1, to a mass of pure water with the same volume as the material, under a pressure of 101.325 kPa, which is a normal atmospheric pressure, at 4° C.

4. An optical system according to claim 1, wherein the following conditional expression is satisfied:

$$1.50 < ndGp1 < 1.71,$$

where ndGp1 represents a refractive index of the material of the positive lens Gp1.

5. An optical system according to claim 1, wherein the following conditional expression is satisfied:

$$0.08 < L12/fGp1 < 0.25,$$

where fGp1 represents a focal length of the positive lens Gp1, and L12 represents an interval on an optical axis between the positive lens Gp1 and the positive lens Gp2.

6. An optical system according to claim 1, wherein the subunit comprises, in order from the object side to the image side, a negative lens, a positive lens, and a negative lens.

7. An optical system according to claim 1, wherein the second lens unit comprises a cemented lens comprising a positive lens and a negative lens.

8. An image pickup apparatus comprising:
an optical system according to claim 1; and
an image pickup element configured to receive an image formed by the optical system.

9. An optical system comprising, in order from an object side to an image side:
a first lens unit having a positive refractive power;
a second lens unit having a negative refractive power, which is configured to move during focusing; and
a third lens unit having one of a positive refractive power or a negative refractive power,
wherein the first lens unit consists of, in order from the object side to the image side:
a positive lens Gp1;
a positive lens Gp2; and
a subunit comprising a plurality of lenses, including at least one negative lens,
wherein the following conditional expressions are satisfied:

$$18 \leq vdGp1 \leq 50.0;$$

$$18 \leq vdGn1 \leq 40.0;$$

$$-0.004 < \theta gFGn1 - 0.6438 + 0.001682 \times vdGn1 < 0.012;$$
and $$2.00 \leq dGp1 \leq 3.006933 \times ndGp1 - 2.01278,$$

where:
vdGp1 represents an Abbe number of a material of the positive lens Gp1,
vdGn1 represents an Abbe number of a material of a negative lens Gn1 closest to the object side among the at least one negative lens of the subunit,
θgFGn1 represents a partial dispersion ratio of the material of the negative lens Gn1,
ndGp1 represents a refractive index of the material of the positive lens Gp1, and
dGp1 represents a specific gravity of the material of the positive lens Gp1, the specific gravity dGp1 of the material being a ratio of a mass of the material at 20° C., which is used for the positive lens Gp1, to a mass of pure water with the same volume as the material, under a pressure of 101.325 kPa, which is a normal atmospheric pressure, at 4° C.

10. An image pickup apparatus comprising:
an optical system according to claim 9; and
an image pickup element configured to receive an image formed by the optical system.

11. An optical system comprising, in order from an object side to an image side:
a first lens unit having a positive refractive power;
a second lens unit having a negative refractive power, which is configured to move during focusing; and
a third lens unit having one of a positive refractive power or a negative refractive power,
wherein the first lens unit consists of, in order from the object side to the image side:
a positive lens Gp1;
a positive lens Gp2; and
a subunit comprising a plurality of lenses, including at least one negative lens,
wherein the following conditional expressions are satisfied:

$$18 \leq vdGp1 \leq 50.0;$$

$$18 \leq vdGn1 \leq 40.0;$$

$$-0.004 < \theta gFGn1 - 0.6438 + 0.001682 \times vdGn1 < 0.012;$$
and $$0.08 < L12/fGp1 < 0.25,$$

where:
vdGp1 represents an Abbe number of a material of the positive lens Gp1,
vdGn1 represents an Abbe number of a material of a negative lens Gn1 closest to the object side among the at least one negative lens of the subunit,
θgFGn1 represents a partial dispersion ratio of the material of the negative lens Gn1, and
fGp1 represents a focal length of the positive lens Gp1, and L12 represents an interval on an optical axis between the positive lens Gp1 and the positive lens Gp2.

12. An image pickup apparatus comprising:
an optical system according to claim 11; and
an image pickup element configured to receive an image formed by the optical system.

13. An optical system comprising, in order from an object side to an image side:
a first lens unit having a positive refractive power;
a second lens unit having a negative refractive power, which is configured to move during focusing; and
a third lens unit having one of a positive refractive power or a negative refractive power, wherein the first lens unit consists of, in order from the object side to the image side:
a positive lens Gp1;
a positive lens Gp2; and
a subunit comprising, in order from the object side to the image side, a negative lens, a positive lens, and a negative lens, wherein the following conditional expressions are satisfied:

$$18 \leq vdGp1 \leq 50.0;$$

$$18 \leq vdGn1 \leq 40.0; \text{and}$$

$$-0.004 < \theta gFGn1 - 0.6438 + 0.001682 \times vdGn1 < 0.012,$$

where:
vdGp1 represents an Abbe number of a material of the positive lens Gp1,
vdGn1 represents an Abbe number of a material of a negative lens Gn1 closest to the object side among the at least one negative lens of the subunit, and
θgFGn1 represents a partial dispersion ratio of the material of the negative lens Gn1.

14. An image pickup apparatus comprising:
an optical system according to claim 13; and
an image pickup element configured to receive an image formed by the optical system.

* * * * *